United States Patent

Sparrendahl

[15] 3,643,030

[45] Feb. 15, 1972

[54] METHOD FOR TRANSFERRING INFORMATION IN THE FORM OF TIME SEPARATED SIGNAL ELEMENTS BETWEEN SUBSCRIBERS IN A TELECOMMUNICATION SYSTEM AND A TELECOMMUNICATION SYSTEM, ETC.

[72] Inventor: Gunnar Erik William Sparrendahl, Vendelso, Sweden

[73] Assignee: Telefonaktiebolaget LM Ericsson, Stockholm, Sweden

[22] Filed: Feb. 6, 1970

[21] Appl. No.: 9,734

[30] Foreign Application Priority Data

Mar. 18, 1969 Sweden.................................3706/69

[52] U.S. Cl.....................................179/15 BA, 179/15 AL

[51] Int. Cl..........................................................H04j 3/00

[58] Field of Search...............179/15 AL, 15 BA; 340/172.5; 325/4; 343/100 ST

[56] References Cited

UNITED STATES PATENTS

| | | | |
|---|---|---|---|
| 3,529,089 | 9/1970 | Davis et al. | 179/15 AL |
| 2,723,309 | 11/1955 | Lair et al. | 179/15 AL |
| 2,920,143 | 1/1960 | Filipowski | 179/15 BA |
| 3,513,264 | 5/1970 | Baer | 179/15 BA |

*Primary Examiner*—Kathleen H. Claffy
*Assistant Examiner*—David L. Stewart
*Attorney*—Hane & Baxley

[57] ABSTRACT

A telecommunication system, in which information is transferred between subscribers in the form of time separated signal elements. Each signal element is accompanied by a specific call number, allotted to the respective connection at the setting up of the connection. The call number allotted to a connection is registered in the subscriber equipment of the subscribers taking part in the connection and transferred in parallel with every signal element to all subscribers in the system. The signal elements can however be received only by the subscribers having the accompanying call number registered.

16 Claims, 14 Drawing Figures

INVENTOR
GUNNAR ERIK WILLIAM SPARRENDAHL
BY Hane and Baxley
ATTORNEYS

INVENTOR
GUNNAR ERIK WILLIAM SPARRENDAHL
BY Hane and Baxley
ATTORNEYS

INVENTOR
GUNNAR ERIK WILLIAM SPARRENDAHL
BY Hane and Baxley
ATTORNEYS

INVENTOR

GUNNAR ERIK WILLIAM SPARRENDAHL

BY Hane and Baxley

ATTORNEYS

INVENTOR

GUNNAR ERIK WILLIAM SPARRENDAHL

BY Hane and Baxley

ATTORNEYS

METHOD FOR TRANSFERRING INFORMATION IN THE FORM OF TIME SEPARATED SIGNAL ELEMENTS BETWEEN SUBSCRIBERS IN A TELECOMMUNICATION SYSTEM AND A TELECOMMUNICATION SYSTEM, ETC.

The present invention relates to a method for transferring information in the form of time separated signal elements and a telecommunication system for executing the method.

An object of the invention is to obtain a telecommunication system of the type mentioned above which is especially suitable for conference calls and which implies advantages over previously used time multiplex systems (TDM-systems) using contact memories. These advantages are obtained thereby that no extra equipment is needed for conference calls as is the case in conventional TDM-systems and conference calls will not affect the system more than normal calls. Another advantage is that the ringing which in conventional TDM-systems requires a special time position for every subscriber in ringing position, will be simplified.

The characteristics of the invention appear from the characterizing part of the claims.

Figure 1:
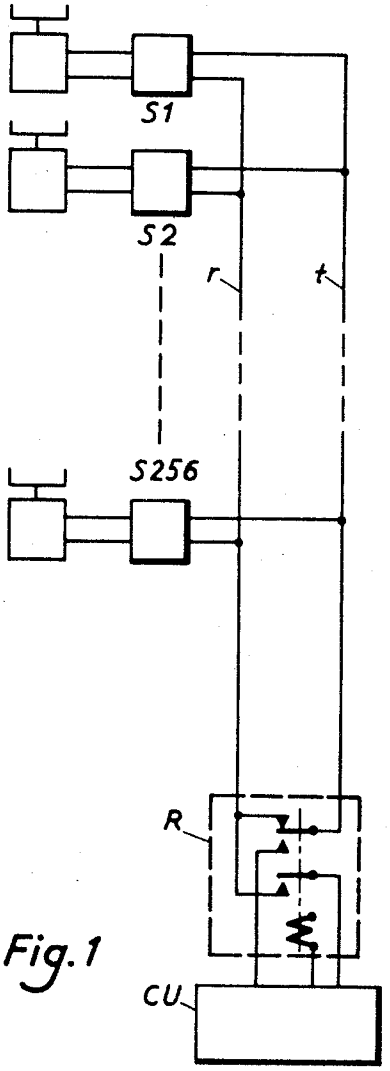
Figures 4A, 4B, 4C, 4D, 4E, 4F, 4G, 4H, 4I:
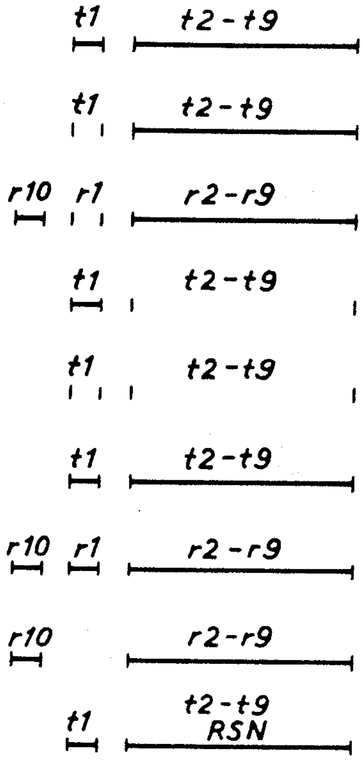
Figure 2A:
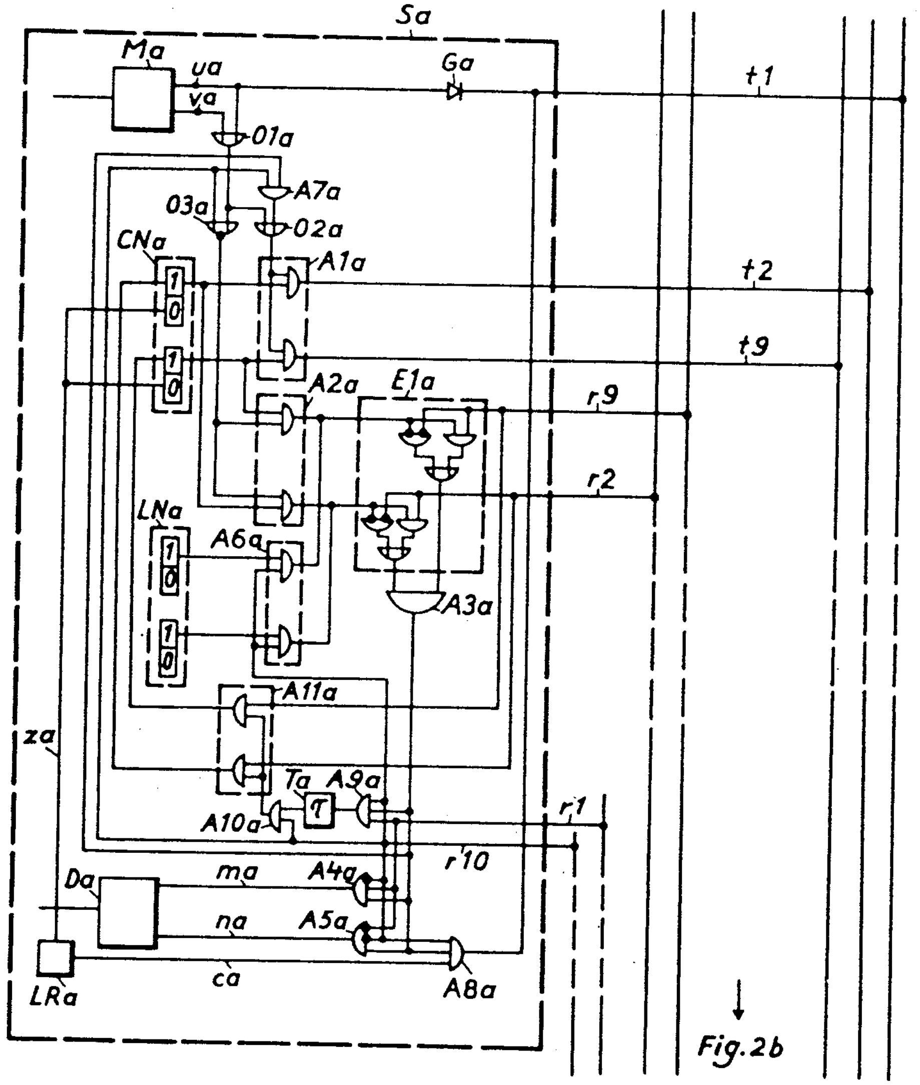
Figure 2B:
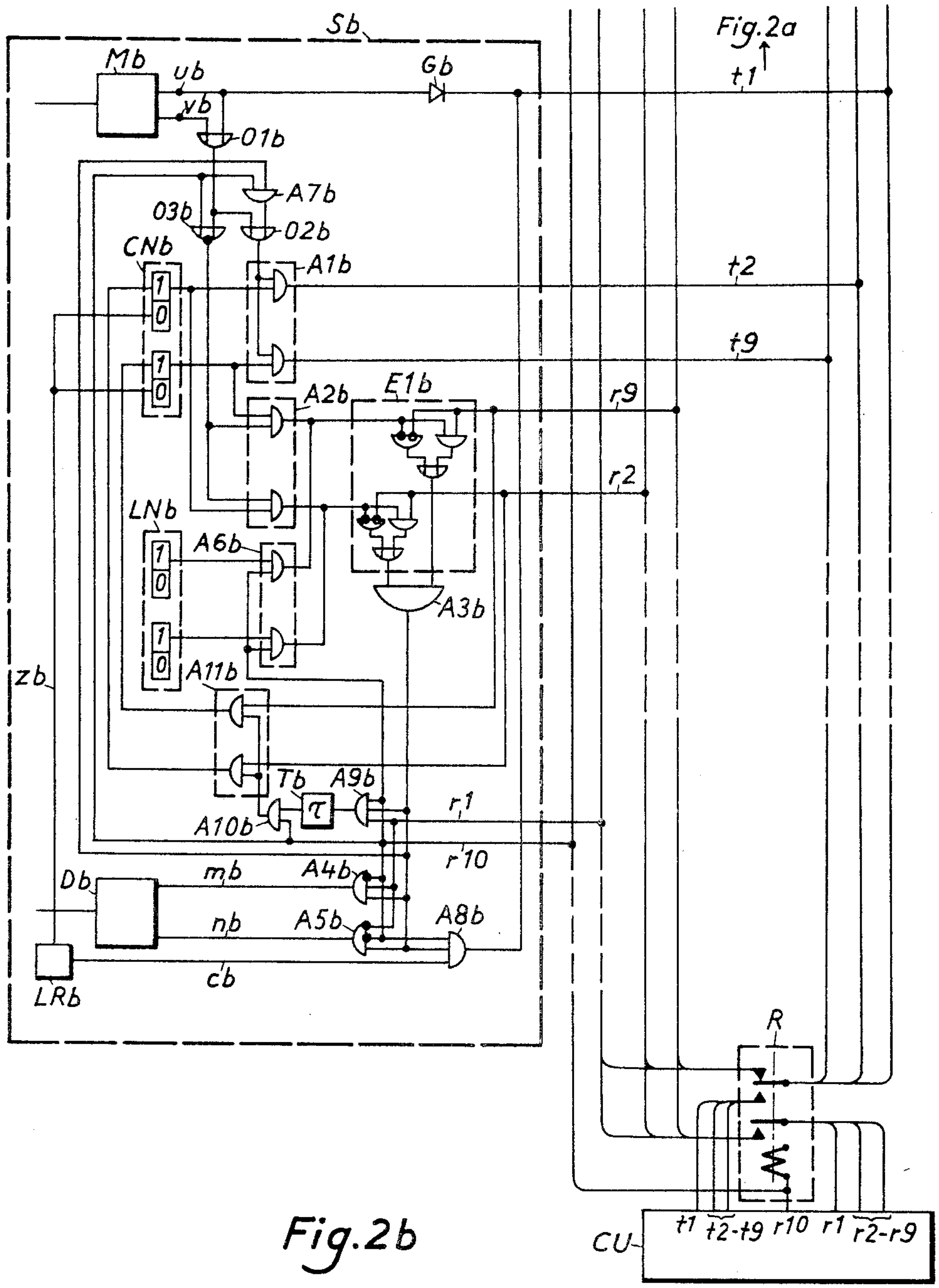
Figure 3:
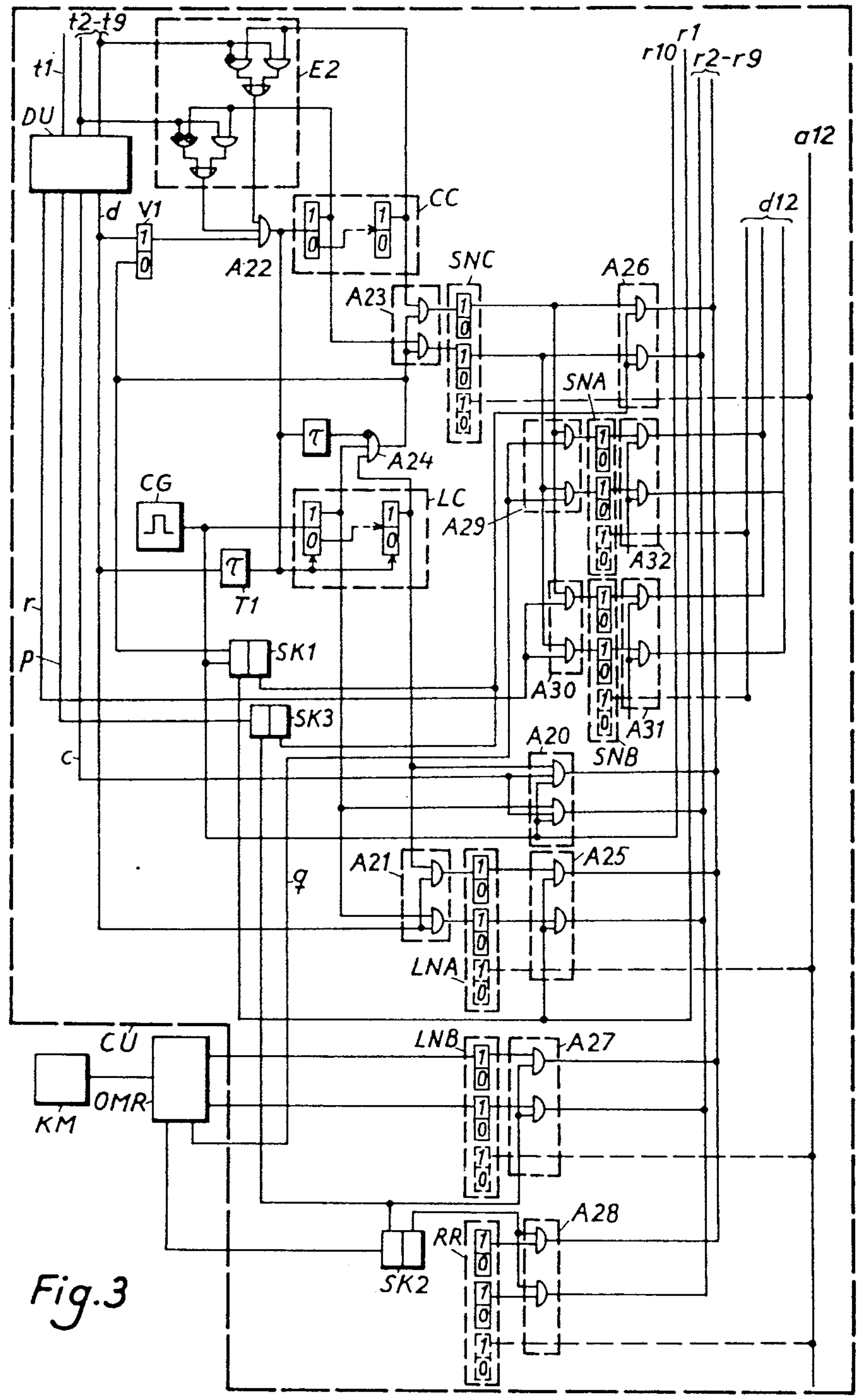
Figure 5:
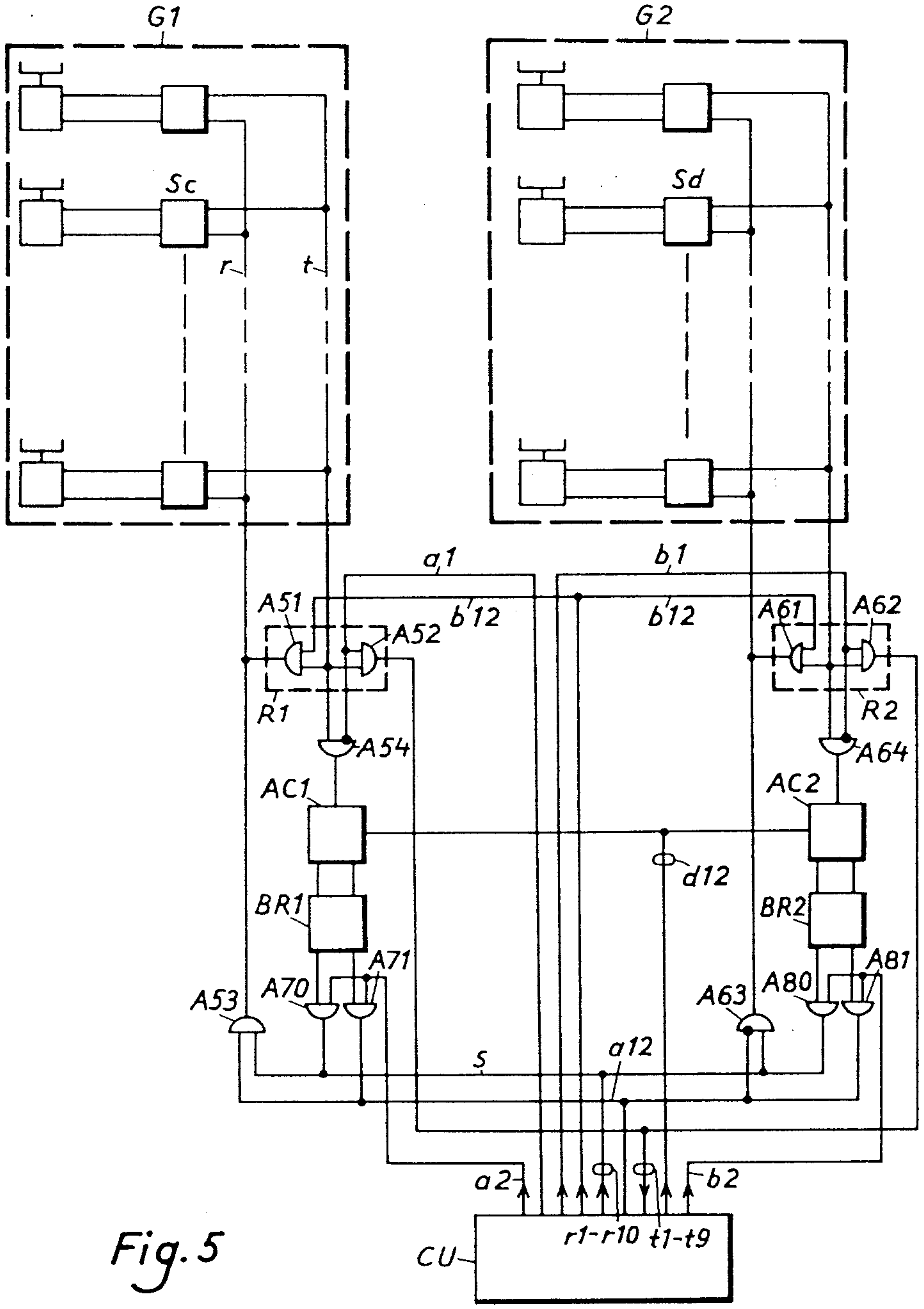

The principal idea of the invention will now be described with reference to the accompanying drawing, where FIG. 1 shows the invention applied to a telecommunication system in which a synchronous delta modulation is used and in which signal elements are transferred between subscribers belonging to the same group of subscribers, FIG. 2*a–b* shows two of the subscriber equipments in the system, FIG. 3 shows a control unit in the system for establishing connections between subscribers, FIG. 4*a*–4*i* the activation of the wires in the transmitting and the receiving line respectively at different times during the process of establishing a connection and FIG. 5 shows a system for transferring delta modulated signals between subscribers belonging to different groups of subscribers.

FIG. 1 shows the invention applied to a telecommunication system in which asynchronous delta modulation is used and in which signal elements are transferred between subscribers belonging to the same group of subscribers. It is however obvious that the invention is not limited to asynchronous delta modulation but can be applied to any type of time multiplex transmission, i.e., even to pulse amplitude and pulse code modulation systems. A number of subscribers are connected to a common multipath transmission line *t* and a common multipath receiving line *r* via an individual subscriber equipment S1–S256. According to the principal idea of the invention, every information signal transmitted from a subscriber to the line *t* is furnished with a call number and the information signal is supplied via the line *r* together with the call number to all the subscriber equipments S1–S256. Only the subscriber equipments set for receiving the transferred call number can accept the transferred information signal. A control unit CU is arranged to set the signal equipment of a calling as well as a called subscriber for transmission and reception respectively of information signals accompanied by a call number and to execute further control functions, for example hook scanning, disconnection etc., as will be explained. The control functions are executed periodically and the transferring of information between subscribers takes place in the interval between the control periods. This is symbolically implied by a switching means R which for example during every other time period connects the lines *t* and *r* to the control unit, so that the scanning and control functions can be executed and during every other time period connects the lines *t* and *r* with each other so that transferring of information between the subscribers is possible.

FIG. 2*a–b* shows the switching means R and the control unit CU together with two of the subscriber equipments S*a* and S*b*, each comprising a delta modulator M*a*, M*b*, a delta demodulator D*a*, D*b*, a call number register CN*a*, CN*b*, a line number register LN*a*, LN*b* and a comparison circuit E1*a*, E1*b*.

The delta modulator M*a*, M*b*, which can be ternary or binary, delivers in the ternary case in known manner a pulse on an output *ua*, *ub* upon an increase of the amplitude of the input signal, greater than a predetermined step, the so-called quantization step. Upon a decrease of the amplitude of the input signal greater than the quantization step, a pulse is obtained on an output *va*, *vb*, and when there is no change in the amplitude of the input signal or upon a change smaller than the quantization step, no output signal will be obtained from the delta modulator. In the binary case either a positive or a negative pulse will always be obtained. The delta modulators M*a*, M*b* indicated in FIG. 2*a–b* are assumed to be ternary.

The demodulator D*a*, D*b* receives the pulse from the output *ua*, *ub* of the modulator M*a*, M*b*, which pulse according to what has been said above is transferred at the same time as a call number. The demodulator interprets the pulse as an increase of the signal amplitude. If a call number but no pulse is received, this is interpreted as a decrease of the signal amplitude and if neither a pulse nor a call number is received, this indicates that no change in the signal amplitude has taken place, as will be explained more in detail in connection with the description of the function of the subscriber equipment.

The line number register LN*a*, LN*b* comprises for example a number of bistable stages, set in correspondence with the line number of the respective subscriber.

The call number register CN*a*, CN*b*, resembles the line member register. The purpose of the call number register is that its stages are to be set in accordance with the call number selected for the respective connection. How this is done will be explained in conjunction with the description of the function of the control unit.

The comparison circuit E1*a*, E1*b* comprises a number of EXCLUSIVE-OR-circuits, corresponding to the number of stages in the line and call number register respectively. The purpose of the comparison circuit is to compare for example a transferred call number with the call number registered in the call number register CN*a*, CN*b* in order to determine whether a transferred information is intended for the subscriber equipment in question.

At first the process during a call between the subscribers S*a* and S*b* will be described. For the moment it is supposed that the control unit CU already has registered a call number for the call in question in the call number registers CN*a* and CN*b* respectively in the subscriber equipments S*a* and S*b* respectively.

A pulse obtained for example on the output *ua* of the modulator M*a* is transmitted on line *t*1 of the multipath transmission line *t*, while a pulse appearing on the output *va* is not transmitted. The call number registered in the call number register CN*a* is however transmitted in both cases. This is done with the help of a number of AND-circuits A1*a* corresponding to the number of stages in the call number register CN*a*. In the present example the number of register stages is assumed to be eight, which means that 256 different binary call numbers and line numbers respectively, can be defined. One input condition for the AND-circuits A1*a* is that the corresponding call number register stage is 1-set. The other input condition is that a pulse is obtained from any of the outputs *ua*, *va* of modulator M*a* via an OR-circuit 01*a* and an OR-circuit 02*a*. Then the call number is transmitted in parallel on a number of lines *t*2–*t*9of the multipath transmission line *t*, each line corresponding to a stage in the call number register CN*a*. In order to avoid that the pulse on the output *ua* of the modulator M*a* activates the transmission of the call number in another call number register, an isolation diode G*a*, G*b* connects the modulator output to line *t*1.

The signalling process during the transferring of information between subscribers as well as during different controlling processes initiated by the control unit CU is indicated in FIGS. 4*a*–4*ia*. The information transmitting processes mentioned above are indicated in FIGS. 4*a*–4*b*. In the case when an increase, greater than the quantization step occurs, the call number is transmitted on the lines *t*2–*t*9 together with a pulse on the line *t*1, as indicated in FIG. 4*a*. Upon a decrease in the input signal to the modulator, greater than the quantization step, only the call number will be transmitted on the lines *t*2–*t*9 as indicated in FIG. 4*b*. When no change in the input signal occurs, no signal will be transmitted on either line *t*1 or lines *t*2–*t*9.

In the call number register CN*b* of the subscriber S*b* (FIG. 2*b*) the same call number is supposed to be registered as in the call number register CN*a* of subscriber S*a* (FIG. 2*a*). For every call number information coming via lines *r*2–*r*9 of the multipath receiving receiving line *r* it has to be determined for which of the subscribers the signal information incoming at the same time, is intended. This is done by comparing the contents of each of the call number registers CN*a*, CN*b* ....with the incoming call number information. In those subscriber equipments, where a complete conformity is obtained, the call information will be accepted. For this purpose a comparison circuit E1*b* is arranged in the subscriber equipment S*a*. The comparison circuit comprises eight EXCLUSIVE-OR-circuits, one input of each circuit being connected to an individual stage in the call number register CN*b*, the other input being connected to the respective line *r*2–*r*9 of the multipath receiving line. In order to avoid that the transmitted signal information is received by the transmitting subscriber equipment, an inverting OR-circuit 03*a* is arranged, which blocks the transferring of the contents of the call number register CN*a* to the comparison circuit E1*a* with the help of AND-circuits A2*a*, as long as a signal appears on any of the outputs *ua*, *va* of the modulator M*a*. The outputs of the EXCLUSIVE-OR-circuits of the comparison circuit E1*b* form inputs to an AND-circuit A3*b*, giving a conformity signal upon conformity in all the eight positions.

The demodulator D*b* has two inputs *mb*, *nb*. When a pulse is received on the input *mb*, the amplitude of the output signal from the demodulator is increased by one quantization step and when a pulse is received on the input *nb*, the amplitude of the output signal is decreased by one quantization step. If no pulse is received on neither the input *mb* or the input *nb*, the output signal maintains its amplitude. In order to produce these two types of pulses from the incoming signal information according to FIGS. 4*a*–4*b*, two AND-circuits A4*b* and A5*b* are arranged, the outputs of which form the respective inputs of the demodulator D*b*. Each AND-circuit has three inputs. One of the input conditions for the AND-circuits A4*b*, A5*b* is that the conformity signal mentioned above appears on the output of the AND-circuit A3*b*, i.e., that the transferred signal information is intended for the subscriber equipment in question. As mentioned earlier the transferring of information and the control functions are executed during alternating time periods. This alternation is controlled by the control unit CU in such a way that the AND-circuits A4*b*, A5*b* obtain a second input condition only during the time period intended for transferring of information, while the input condition mentioned is missing during the time period intended for control functions. Said second input condition is obtained according to the example in such a way that an inverting input of the respective AND-circuit A4*b*, A5*b* is connected to a line *r*10 which is activated by the control unit CU during the time periods intended for control functions, as will appear in conjunction with the description of the control unit CU. A third input condition is obtained via the line *r*1 in the form of a pulse or no-pulse on line *t*1 from the output *ua* of the modulator M*a*. The line *r*1 is connected directly to an input of the AND-circuit A4*b* and to the AND-circuit A5*b* via an inverting input. As a consequence of this, a pulse will be obtained on the inputs *mb* and *nb* respectively of the demodulator D*b* in correspondence to that a pulse appears on line *r*1 or not.

The periodic alternation between controlling and transferring of information is indicated by the switching means R, represented according to the example by a relay function with a number of make-and-break contacts. In FIG. 2*b* the switching means R is shown in the position for transferring of information. In its other position the switching means R connects the multipath line *t* and *r* to the control unit CU, as will be described more in detail in connection with the description of the control unit and its function. The switching means R can of course be made up of electronic means and the relay arrangement is used only to simplify the description.

FIG. 3 shows schematically the control unit CU with only these means indicated which are necessary for understanding the fundamental principle of the invention. The control unit CU has a number of input terminals connectable to the multipath transmission line *t* and a number of output terminals connectable to the multipath receiving line *r* via which the information necessary for executing the control function is obtained and the control signals are transmitted respectively.

The function of the control unit CU will be explained in connection with the setting up of a connection between a calling and a called subscriber, for example, the subscribers S*a* and S*b* respectively indicated in FIG. 2. The process can be split up into five steps: scanning of the subscriber equipments, connection of a calling subscriber to a dialling signal receiving means, transferring of dialled information tracing of a called subscriber and establishing the connection.

The control unit scans the subscriber equipments in order to determine their free/busy condition and detect when a call is made. For this purpose the control unit CU, shown in FIG. 3, comprises a line number counter LC, which is stepped one step during each control period with the help of pulses from a clock pulse generator CG, so that it once during 256 consecutive control periods registers each of the 256 line numbers. The contents of the line number counter LC are fed via AND-circuits A20 to the lines *r*2–*r*9 at the same time as the line *r*10 is activated to indicate that controlling and not transferring of information between subscribers is taking place, as indicated in FIG. 4*c*. The feeding of a line number from the line number counter IC is done in dependence on the fact that besides that the line *r*10 being activated, a further condition is fulfilled namely, that there is a scanning process that is being executed and not a process for establishing a connection. Said further condition is obtained from a logic unit DU through a line *c* as will be explained below. The line numbers transmitted in proper order are transferred to all of the subscriber equipments but only that one having a line number corresponding to the transmitted line number is however activated. It is assumed that during a certain time period the line number corresponding to the subscriber S*a* is transmitted. As mentioned before the line number belonging to the subscriber is registered in the line number register LN*a* in the subscriber equipment S*a* in FIG. 2 and the registered line number is now to be compared with the line number coming via lines *r*2–*r*9. For the comparison, the comparison circuit E1*a* described above is used, and the line number registered in the line number register LN*a* is transferred to the comparison circuit E1*a* via AND-circuit A6*a*. These are activated by the signal received via the line *r*10. Upon reception of the conformity signal from the AND-circuit A3*a* and AND-circuit A7*a* is activated. Its input conditions are, besides the appearance of the conformity signal, that a pulse is obtained via the line *r*10. As a consequence of the output signal from the AND-circuit A7*a* the contents of the call number register CN*a* are transmitted via the lines *t*2–*t*8 to the control unit CU. If the subscriber is marked free, the call number register CN*a* is set to zero, since it is assumed that each stage of the call number register is set to zero upon clearing down of a connection, by a pulse through a line *za* from the line relay LR*a* of the subscriber. In this case no call number is transmitted to the lines *t*2–*t*8. Depending on whether the subscriber makes a call or not, two cases are possible. If the subscriber makes a call, a line *ca* is activated from the line relay LR*a*. The line *ca* is connected to one of the inputs of an AND-circuit A8*a* having two further input conditions. First, that a conformity signal is obtained from the AND-circuit A3*a* and second, that the line *r*10 is activated. The output of the AND-circuit A8*a* is connected to the line *t*1, so that when all of the input conditions are fulfilled, a pulse is obtained which is transferred to the control unit CU via the line $t1$. This is schematically indicated in FIG. 4*d*. If the subscriber does not make a call, no signal is obtained on either the line $tl$ or the lines $t2$–$t8$ as indicated in FIG. 4*e*. If the subscriber in question is busy, the call number, characteristic for the connection is obtained from the call number register CN*a* via the lines $t2$–$t8$ together with a pulse via the line $t1$, as indicated in FIG. 4*f*. The control unit CU evaluates the information coming via the lines $t1$–$t9$, so that if no signal is obtained on any of the lines, the stepping of the line number counter LC is continued and the subsequent line number is transmitted during the next control period. If on the other hand a pulse is obtained via the line $t1$, this is interpreted as a call. The evaluation is done with the help of a logic unit DU in the control unit CU which in the first-mentioned case does not produce any signal on an output *d*. In the last-mentioned case a pulse appears on the output *d*, which makes possible the transferring of the contents of the line number counter LC to a calling line number register LNA via a number of AND-circuits A21. Thus in the register LNA, the line number is registered for which a pulse is obtained via the line $t1$ in conjunction with a scanning process, i.e., the line number of a calling subscriber.

A free call number must now be selected so that it can be used when the calling subscriber is connected to a schematically indicated code receiver KM. The code receiver is essentially equipped as the subscriber equipments. The selection of a free call number is done with the help of a call number counter CC in the control unit CU, the subsequent settings of which each represents a call number. When the process is initiated, the counter CC is in the position representing the latest selected call number. The counter is stepped one step at a time, after which it is determined by a comparison operation if the call number at present indicated by the counter is registered in any of the subscriber equipments or not. If the call number indicated by the counter CC is found in any of the subscriber equipments, this means that the call number in question is already occupied. The stepping of the counter CC must therefore continue until a call number is found which is not registered in any of the subscriber equipments. The search for a free call number is initiated when the signal, representing a calling subscriber is received from the output *d* of the logic unit DU. This signal sets the line number counter LC to zero via a delay circuit T1 at the same time as the call number counter CC is stepped one step so that it does not have to begin the comparison operation mentioned above with the latest selected call number. The clock pulse generator CG then steps the line number counter LC and the line numbers are transmitted in due order through the lines $r2$–$r9$ in the same way as described above in conjunction with the subscriber scanning process. Parallel with the line number, a pulse is transmitted via the line $r10$ to mark a control period, as indicated in FIG. 4*c*. In the subscriber equipments the process will be essentially the same as during the scanning of the subscribers. The incoming line number is compared with the registered line number and upon conformity the call number registered in the call number register is transmitted via the line $t2$–$t9$. In the control unit CU the call number coming from the subscriber equipments via the lines $t2$–$t9$ is compared with that in the call number counter CC with the help of a number of EXCLUSIVE-OR-circuits E2. If conformity is obtained in all the digital position, thus indicating that the call number in question is occupied, the counter CC is stepped one step at the same time as the line counter LC is set to zero, after which it is controlled in the same way if the new call number in the counter CC is free or not. A22 indicates an AND-circuit, the output signal of which executes the stepping of the counter CC and the zero setting of the counter LC. The activation of the AND-circuit A22 is determined both by the condition that an output signal is received from all the EXCLUSIVE-OR-circuits E2 and by the condition that a flip-flop circuit V1 is 1-set, indicating that the process of searching for a free call number is executed and not a normal scanning of the subscriber. The flip-flop circuit V1 is 1-set by the signal appearing on the output *d* of the logic circuit DU when a calling subscriber is detected and set to zero when a free call number is found.

If conformity is not found between the call number in the counter CC and any of the call numbers coming in via the lines $t2$–$t9$ in due order from the subscriber equipments, when the counter LC has run through all the line numbers, the call number in question is free. The contents of the call number counter CC are transferred to a call number register SNC via AND-circuits A23 by an output signal from an AND-circuit A24. The activation of this AND-circuit depends on the fact that all stages of the line number counter LC are 1-set and that a signal has not been received from the output of the AND-circuit A22. The last-mentioned condition is necessary to ensure that a conformity signal does not appear for the last line number combination.

A free code receiver KM, whose line number is assumed to be registered in a code receiver number register (not shown) in the control unit CU in the same way as the line number of the calling subscriber is registered in the register LNA, shall now be connected to the calling subscriber. The connection of a code receiver is essentially the same as the connection of the called subscriber, as will hereinafter be explained. The dialing can be executed in any known method and will not be described in more detail. After the dialling the line number of the called subscriber is assumed to be transferred from a translator OMR, connected to the code receiver to a called line number register LNB in the control unit CU.

In order to bring about a connection between the calling subscriber, the subscriber S*a* according to the example, and either a free code receiver or a called subscriber, for example the subscriber S*b*, the selected call number must be registered in the subscriber equipment of the calling subscriber as well as in the code receiver and the subscriber equipment of the called subscriber respectively. Via the lines $r2$–$r9$ the line number of the calling subscriber is transmitted in a first phase from the register LNA via AND-circuits A25, activated by a signal from a time delay circuit, schematically indicated as a shift register SK1, according to the example. The shift register is activated by the signal from the AND-circuit A24 when a free call number is found. When the line number is transmitted, the line $r1$ is also activated by the first stage of the shift register to mark that a process for registering in a call number register has begun. The line $r10$ is activated dependent on the fact that a control period takes place (compare FIG. 4*g*). The line number information coming in via the lines $r2$–$r9$ to the subscriber equipments is compared in each of the subscriber equipments with the line number registered in the respective line number register in order to determine for which subscriber the information is intended. In the subscriber equipment S*a*, according to the example chosen as the calling subscriber, the incoming line number is compared in the comparison circuits E1*a* with the line number registered in the register LN*a* in the same way as described in conjunction with the scanning of subscribers described above. Upon conformity a signal is obtained from the AND-circuit A3*a*. Due to the fact that the line $r1$ as well as the line $r10$ are activated, an output signal will be obtained from an AND-circuit A9*a*. This output signal is fed to an AND-circuit A10*a* via a delay circuit T*a*. The object of the delay circuit T*a* is to supply a signal to the AND-circuit A10*a* during the next control period to make the registering of the selected call number in the call number register CN*a* of the calling subscriber possible. With the same delay, the AND-circuits A26 in the control unit CU are activated from the shift register SK1, stepped for example by the clock pulse generator CG. During the subsequent control period the selected call number is transmitted from the call number register SNC on the lines $r2$–$r9$ together with a signal on the line $r10$, as indicated in FIG. 4*h*. The call number can now be registered in the call number register CN*a* of the subscriber S*a* due to the fact that AND-circuits A11*a* are activated by the output signal from the AND-circuit A10*a*, receiving besides the delayed signal from the delay circuit T*a*the signal on the line $r10$.

The connection of the free code receiver corresponds to the process described above. The only difference is that in the first phase, the number of the free code receiver is transmitted from the code receiver number register mentioned above. In the same way as described above the selected call number is then transferred to the code receiver KM in this case.

As mentioned the dialling can be executed in any known manner and will not be described in detail since it is unnecessary for the understanding of the fundamental principle of the invention.

When the subscriber's number has been received in the code receiver, it is translated in the translator OMR into a line number which is registered in the called line number register LNB. The calling up of the called subscriber S*b* is done in essentially the same way as described in connection with the registering of a call number in the subscriber equipment of the calling subscriber. The line number of the called subscriber S*b* is transmitted in a first phase from the register LNB. In the second phase a call number is however not transmitted but a certain binary combination, a ringing signal number RSN via the lines *r*2–*r*9 together with a signal on the line *r*1. The control of the different phases is executed in a similar way as described in connection with the registering of the selected call number in the call number register CN*a* of the calling subscriber. In this case a shift register SK2 is used, which is stepped by a signal from the translator OMR in connection with the transferring of the line number of the called subscriber to the register LNB from the translator OMR. The first stage of the shift register SK2 initiates the transmitting of the line number of the called subscriber from the register LNB via AND-circuits A27 and its second stage initiates the transmitting of said ringing signal number RSN from a ringing number register RR via AND-circuit A28 to the subscriber equipment which in the first phase has been prepared for reception. The ringing signal number is transmitted continuously during the periods for transferring of information to all the subscriber equipments from a not shown ringing signal code generator via the lines *r*2–*r*9 together with a delta modulated ringing signal via the line *r*1. By this a conformity signal is produced in the subscriber equipments which are to receive a ringing signal and which as a consequence have the ringing signal number registered in the call number register in essentially the same way as during a normal call. The appearance of said conformity signal from the AND-circuit A3*b* depends on that conformity has been obtained in the comparison circuit E1*b* between the special ringing signal number registered in the call number register CN*b* and the ringing signal number coming in via the lines *r*2–*r*9 from the ringing signal code generator. By this the AND-circuits A4*b*, A5*b* are activated in exactly the same manner as described in conjunction with the transferring of call information (compare the FIGS. 4*a*–4*b*). The only difference is, depending on the on-hook position of the handset, that the demodulated sound information is fed to a, now shown, loudspeaker in the telephone set. This loudspeaker is assumed to be disconnected during a call.

The calling subscriber S*a* will receive ringing tone at the same time, for example from the code receiver connected to the subscriber during the setup, which transmits a delta modulated ringing tone together with the selected call number back to the calling subscriber so that he will receive a ringing tone via the removed handset.

When the called subscriber S*b* answers, the line *cb* obtains a potential from the line relay LR*b* in the same manner as when the subscriber S*a* made a call. This means that during the next scanning, the ringing signal number RSN registered in the call number register CN*b* will be transmitted to the lines *t*2–*t*9 together with a signal on the line *t*1 from the AND-circuit A8*b*, as indicated in FIG. 4*i*. The difference in relation to a call is, as appears from the FIG. 4*d*, that when a call is made, the call number register of the calling subscriber is set to zero. The logic unit DU interprets the received information and a signal will be obtained on a line *p*, initiating the transmitting of the line number of the called subscriber from the register LNB followed by the selected call number from the register SNC. In this case, a shift register SK3 is used, its first stage activating the AND-circuits A27, so that the line number is transmitted and its second stage activating the AND-circuits A26. By this the call number is transmitted and registered in the call number register CN*b* of the called subscriber. Thus, the connection is established and the transferring of call signals can commence, as described in conjunction with FIGS. 4*a*–4*b*.

The FIG. 5 shows a block diagram of a telecommunication system according to the invention with two groups G1 and G2 of subscribers, in which the subscribers can carry on a conversation within as well as between the groups. The system can of course comprise any number of groups of subscribers but in order to simplify the description only two groups are shown. Each of the groups G1, G2 corresponds to the group described in connection with the FIG. 1. According to the example each group comprises 256 subscribers. The control unit CU is in this case arranged to attend to control functions for communication within each group as well as communication between the groups. Its function corresponds essentially to the function of the control unit described in connection with FIG. 3. Means which are necessary in the control unit in a system comprising several groups of subscribers, have been inserted in FIG. 3. In a plural group system according to the FIG. 5, the different periods of function are not divided only into control periods and call transferring periods but each group must have its own control period. The call transferring within the respective groups can be executed in parallel during a call transferring period, but it is suitable to allot a time period to each group when call transferring to the other groups can be made, in order to guarantee the transferring, as it will be explained. If for example the control periods for the two groups G1 and G2 are denoted *u*1 and *u*2 respectively, if the call transferring period within the respective group is denoted *j*0 and if the call transferring period from the group G1 to the group G2 and from the group G2 to the group G1 respectively is denoted *j*1 and *j*2, respectively, the periods can have the following pattern of repetition: *j*0, *j*1, *j*0, *j*2, *j*0, *u*1, *j*0, *j*2, *j*0, *u*2 . . . etc. The same line and call number series are supposed to be used within the respective group of subscribers. As long as only calls between subscribers belonging to the same group are to be established, the process corresponds to the processes described in conjunction with the FIGS. 1–4, but with the difference that the control unit executes control functions within the respective groups during the control periods *u*1 and *u*2 respectively. For this purpose the control unit activates during the respective control period, the line groups *r*1–*r*10 and *t*1–*t*9 belonging to the respective group of subscribers via switching means R1 and R2 respectively belonging to each group of subscribers in the same manner as described in connection with only one group of subscribers. The switching means are for the sake of simplicity indicated as logic circuits comprising AND-circuits A51, A52 and A61, A62 respectively. Each of the AND-circuits represents nine AND-circuits, each belonging to one of the lines *t*1–*t*9. During the call transferring period *j*0, the AND-circuits A51 and A61 are activated via a line *b*12 from for example a not shown shift register in the control unit CU. By this the call information can be transferred within the group G1 as well as within the group G2 in the same manner as was the case with only one group of subscribers. During the control period *u*1 belonging to the group G1, the AND-circuit A52 is activated from the not shown shift register via a line *a*1 which makes possible the transferring of information from the group G1 of subscribers to the control unit CU for interpretation. Correspondingly the AND-circuit A62 is activated during the control period *u*2 via a line *b*1 to make possible the transferring of information from the group G2 to the control unit. In order to transfer control information from the control unit to the group G1, an AND-circuit A53 is arranged. This is activated at the same time as the AND-circuit A52 by a signal via the line *a*12 from the control unit. For the transferring of control information in the group G2, an AND-circuit A63 is arranged. The difference towards the AND-circuit A53 is that the AND-circuit A63 is connected to the line *a*12 via an inverting output which means that the AND-circuits A53 and A63 can never be activated at the same time. This simplified control method is of course possible only in a system with two groups of subscribers. In a system with several groups of subscribers, a number of lines must be used in order to connect the control unit to one of the groups at a time.

As mentioned earlier the transferring of call information from the group G1 to the group G2 and from the group G2 to the group G1 respectively is carried out during the periods *j*1 and *j*2 respectively. A common line *s* is arranged to transfer call number and call information between the groups while the signal on the line *a*12 indicates which group the information is intended for. The call information intended for a subscriber within the same group or intended for a subscriber in another group is supposed to appear in the respective groups only during the time periods *j*0. In order to store the information intended for another group until the transferring can be executed, a memory means is necessary. According to the example a buffer register BR1 is arranged to store in due order during the period *j*0 the call information appearing in the group G1 and intended for the group G2 until transferring is allowed during the period *j*1. For the same reason, a buffer register BR2 is arranged to store information from the group G2 intended for the group G1 until the transferring period *j*2 occurs.

As previously mentioned the same call number series are used within the two groups of subscribers. In order to make this possible even for communication between the groups one call number is allotted to the calling subscriber within its group, while another call number is allotted to the called subscriber within its group. Thus two different call numbers belong to the connection. A translation to the call number valid within the respective group will be necessary upon communication between the groups. The translation of a call number belonging for example to the group G1 into the call number allotted to the connection in question within the group G2 is done with the help of an address translating register AC1 belonging to the group G1. The address translating register AC1 is connected to the subscriber equipments via the multipath transmission line *t*. Similarly the translation of a call number within the group G2 into a call number belonging to the group G1 is done with the help of an address translating register AC2. Every address translating register has for every call number within the own group a storage cell which is addressed by the appearance of the respective call number on the lines *t*2–*t*9 of the multipath transmission line *t*. In the storage cells, corresponding to the call number within the own group, in the respective address translating register AC1, AC2 the control unit can register the call number valid for the connection in another group together with a marking, indicating the group, as it will be explained. The setting up of a connection between subscribers belonging to different groups is executed in essentially the same way as described in conjunction with the setting up of a connection within a group. Suppose as an example that a subscriber S*c* belonging to the group G1 calls a subscriber S*d* in the group G2. The call is detected upon scanning of the group G1 during the control period *u*1, after which a call number is allotted to the calling subscriber and the subscriber is connected to a free code receiver KM in exactly the previously described manner. In order to indicate in the control unit for which group a line number or a call number is intended, the line and call number registers must include a further stage which can be connected to the line *a*12 for indicating group belonging. This is schematically indicated in the FIG. 3. The further stage in the registers is set to 1 or 0 in dependence on whether the contents in the respective register are intended for the group G1 and the group G2 respectively. The tracing of a called subscriber with the help of the number information received from the code receiver and the initiating of the ringing signal is done in the same way as earlier described. The difference is that the process in this case is done during the control period *u*2 intended for the group G2, since the called subscriber is supposed to belong to the group G2. In order to select a free call number within the group G2 for the called subscriber with the help of the call number register CC, the call number selected for the calling subscriber within the group G1 is transferred from the register SNC to a register SNA. The transferring can for example be done when the line number of the called subscriber has been received from the translator OMR by a signal on a line *q*, activating in this case AND-circuits A29. An answer from a called subscriber means that a signal is obtained from the logic unit DU on the line *r*, and the call number selected for the called subscriber is transferred from the register SNC to a storage register SNB via AND-circuits A30.

As mentioned earlier, the call number valid within the other group for the connection in question, must be registered in the storage cell belonging to the respective call number within the own group in the translating registers AC1 and AC2 respectively for the respective group upon a communication between different groups. Every translating register comprises for example a matrix of binary flip-flop circuits, in which each column corresponds to a position in a call number within the other group. The information concerning the group belonging is supposed to be included in the call number. Each row in the matrix corresponds to a call number within the own group. The rows can be selected for example with the help of a not shown diode matrix via either the lines *t*2–*t*9 from the own group or from the control unit via the schematically indicated line group *d*12. When the call number of the calling subscriber as well as of the called subscriber has been received in the registers SNA and SNB respectively, this information must be transferred to the respective translating register AC1, AC2. During the control period *u*1, belonging to the group C1, the columns of the translating register AC1 are activated by the contents of the register SNB, transmitted on the line group *d*12 in a first phase via AND-circuits A31 which can be activated from a stage in a not shown shift register. The row of the translating register AC1, corresponding to the contents of the register SNA, is selected in a second phase when the contents of the register SNA is transmitted via AND-circuits A32 on the line group *d*12. In this way the call number within the other group for the connection is obtained in the storage cell in question in the translating register AC1. The process is the same upon registering of the call number within the group G1 in the translating register AC2 during the control period *u*2. In this case the columns are activated by the contents of the register SNA, while the row in question is selected by the contents of the register SNB. A call number belonging to the group G1 is thus registered on the row of the translating register AC2, corresponding to the call number within the own group of the connection in question. When a call information intended for another group is obtained via the line *t*1 in parallel with the call number valid within the own group via the line *t*2–*t*9, the call number information in the translating registers makes possible that the call number within the other group belonging to that call number is transferred to the buffer register in parallel with the call information. The buffer register which can be of any known design, stores the call number information obtained from the translating register in parallel with the call information in order to be transmitted later on the line *s*. During the transferring period *j*0 the information intended for subscribers within the respective groups is transferred as mentioned earlier via the AND-circuit A51 to the lines *r*1–*r*9, while information intended for other groups are stored in due order in the respective buffer registers. In order not to store in the buffer registers BR1 and BR2 respectively during the control periods *u*1 and *u*2, AND-circuits A54 and A64 respectively are arranged to block the translating registers AC1 and AC2 respectively. Call and call number information are for example transmitted from the buffer register BR1 via AND-circuits A70 at the same time as the information concerning the group belonging is obtained via an AND-circuit A71. These AND-circuits are activated via a line *a*2 from the not shown shift register in the control unit CU during the transferring period *j*1. Correspondingly, AND-circuits A80 and A81 respectively are activated for a transmitting of information from the buffer register BR2 belonging to the group G2 during the period *j*2 via a line *b*2.

As explained above, the call information is transmitted from the respective subscriber equipment only when a change of amplitude of the input signal has occurred, greater than the so-called quantization step. Upon positive changes the transferred information corresponds to that indicated in the FIG. 4*a* and upon negative changes that indicated in the FIG. 4*b*. When there are several groups of subscribers, a group belonging signal will in both these cases be obtained on the line *a*12. By this the transferring to the respective group is controlled in such a way that the AND-circuits A54 and A64 respectively are activated in dependence on the signal via the line *a*12. By an alternating activation of the lines *a*2 and *b*2, the information from the group G1 and the group G2 respectively is transmitted.

The system described has the obvious advantage over known systems that a conference call is possible without any special equipment. It is also possible to make a time multiplex division within the respective groups in order to eliminate a mixing of the information which can be obtained at the same time from a number of subscribers. As a rule it is however possible to suppose that information is transmitted so by chance from the subscribers that no disturbance will be noticed.

I claim:

1. A method for transferring information in the form of time separated signal elements between subscribers in a telecommunication system which comprises:

allotting a call number to each connection to be established between subscribers, registering the call number in the subscriber equipment of each subscriber that is a party to the connection, transferring the call number in parallel with each signal element to all subscriber equipments in the telecommunication system, and at each subscriber station comparing all received call numbers with the call number registered in the subscriber equipment whereby the signal elements can be received only by the subscriber equipments having the call number registered.

2. A method as recited in claim 1, wherein the signal elements are synchronous delta modulated signals.

3. A method as recited in claim 1, wherein the signal elements are asynchronous delta modulated signals.

4. A method as recited in claim 1, wherein the signal elements are pulse amplitude modulated signals.

5. A method as recited in claim 1, wherein the signal elements are pulse code modulated signals.

6. A telecommunication system comprising: at least one group of subscriber equipments; a control unit; and a transmission channel interconnecting said subscriber equipments and said control unit, said control unit including means for selecting a call number from a set of available call numbers when a connection is to be established between at least two of said subscriber equipments and means for transferring the selected call number to said transmission channel; and each subscriber equipment including information transmitting means, information receiving means, means responsive to said control unit for registering the selected call number on said transmission channel from said control unit, means operative in synchronism with said information transmitting means to transmit the so-registered call number to said transmission channel, comparison means for comparing the call number stored in said registering means with subsequently received call numbers from other subscriber equipments, and means for activating said information receiving means when said comparing means indicates a conformity between the call number stored in said registering means and a subsequently received call number from another subscriber equipment.

7. A telecommunication system as recited in claim 6 wherein said information transmitting means and said information receiving means is a delta modulation transmitter-receiver.

8. A telecommunication system as recited in claim 6 wherein said information transmitting means and said information receiving means is a pulse amplitude modulation transmitter-receiver.

9. A telecommunication system as recited in claim 6 wherein said information transmitting means and said information receiving means is a pulse code modulation transmitter-receiver.

10. A telecommunication system as recited in claim 6, comprising a switching means (R) for connecting during alternating time periods, the subscriber equipments (S1–S256) to each other for transferring signal elements between the subscribers, and the subscriber equipments to the control unit (CU) for transferring control information between the control unit and the subscriber equipments.

11. A telecommunication system as recited in claim 6 wherein each subscriber equipment further comprises a line number register where a line number associated with the respective subscriber is registered, the comparison means (E1*a*, E1*b*) comparing the line number registered in the line number register (LN*a*, LN*b*) with each control information transmitted from the control unit (CU) during the time periods intended for transferring of control information between the control unit (CU) and the subscriber equipment in order to determine if the control information is intended for the subscriber in question.

12. A telecommunication system as recited in claim 6 further comprising a ringing signal code generator for continuously transmitting a ringing signal number (RSN) together with a signal element representing a ringing signal to all the subscriber equipments, the control unit (CU) further comprising means (SK2) for registering the ringing signal number in the registering means (CN*a*, CN*b*) of each called subscriber so that in the subscriber equipments where conformity is obtained in the comparison means (E1*a*, E1*b*) between the ringing signal number registered in the registering means (CN*a*, CN*b*) and the ringing signal number transmitted from the ringing signal code generator, the information receiving means being activated in the same way as upon reception of other signal elements.

13. A telecommunication system as recited in claim 6, the control unit (CU) further comprises a ringing tone code generator arranged to be connected to a calling subscriber and to transmit signal elements representing a ringing tone together with the call number registered in the registering means (CN*a*, CN*b*) of the calling subscriber, the signal elements representing the ringing tone being demodulated in the same way as other signal elements.

14. A telecommunication system as recited in claim 6 wherein the subscribers are arranged in groups (G1, G2), the subscriber equipments belonging to the same group being connected directly with each other during time periods for transferring of signal information, each group comprising a translating register (AC1, AC2) with a storage cell for each possible call number within the same group for storing a call number belonging to a subscriber within another group with which a connection has been established, so that when a call number together with a signal element intended for a subscriber in another group is transmitted from a subscriber, the transmitted call number is replaced in the translating register (AC1 AC2) by the call number valid within the other group and stored in the corresponding storage cell, the control unit (CU) further comprising means for registering in the translating register (AC1, AC2) in the respective group the call number selected from the other group in the storage cell corresponding to the selected call number within the associated group upon establishing a connection between subscribers belonging to different groups.

15. A telecommunication system as recited in claim 6 wherein the subscribers are arranged in groups and each subscriber group (G1, G2) further comprises a buffer register (BR1, BR2) to which the signal elements intended for other groups are fed in due order from the group, and the control unit further comprising timing means for transmitting the signal elements from the buffer register (RB1, RB2) so that the transmitting is executed in cyclical order from the different buffer registers.

16. A telecommunication system as recited in claim 6 wherein the subscribers are arranged in groups and each subscriber group (G1, G2) further comprises control circuits (R1, R2, A70, A71, A80, A81) activated by timing means in the control unit so that the transferring of information between subscribers belonging to the same group is done during certain periodically repeated time periods (*j*0) during which registering of information intended for other groups is done in the buffer registers (BR1, BR2), while the transferring of information from the respective buffer register to other groups is done during the time periods (*j*1, *j*2) separated from the first-mentioned time periods and the control of the different groups is executed alternately during an individual time period (*u*1, *u*2) separated from the periods for transferring information.

* * * * *